US 10,221,761 B2

(12) United States Patent
Sandoval

(10) Patent No.: US 10,221,761 B2
(45) Date of Patent: Mar. 5, 2019

(54) TURBINE MINIDISK BUMPER FOR GAS TURBINE ENGINE

(71) Applicant: United Technologies Corporation, Hartford, CT (US)

(72) Inventor: Jonathan Perry Sandoval, Hebron, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 587 days.

(21) Appl. No.: 14/783,225

(22) PCT Filed: Apr. 7, 2014

(86) PCT No.: PCT/US2014/033154
§ 371 (c)(1),
(2) Date: Oct. 8, 2015

(87) PCT Pub. No.: WO2014/172130
PCT Pub. Date: Oct. 23, 2014

(65) Prior Publication Data
US 2016/0069259 A1  Mar. 10, 2016

Related U.S. Application Data

(60) Provisional application No. 61/813,375, filed on Apr. 18, 2013.

(51) Int. Cl.
*F02C 3/04* (2006.01)
*F01D 5/02* (2006.01)
*F01D 5/06* (2006.01)

(52) U.S. Cl.
CPC .............. *F02C 3/04* (2013.01); *F01D 5/02* (2013.01); *F01D 5/026* (2013.01); *F01D 5/066* (2013.01);
(Continued)

(58) Field of Classification Search
CPC . F01D 5/02; F01D 5/066; F01D 5/026; F01D 5/3015; F01D 5/32; F01D 5/326;
(Continued)

(56) References Cited

U.S. PATENT DOCUMENTS 4,653,984 A   3/1987  Robbins
4,664,599 A   5/1987  Robbins et al.
(Continued)

FOREIGN PATENT DOCUMENTS

EP   2412923       2/2012
WO   2011136833    11/2011
WO   2014015142    1/2014

OTHER PUBLICATIONS

International Preliminary Report on Patentability for Application No. PCT/US2014/033154 dated Oct. 29, 2015.
(Continued)

*Primary Examiner* — Jason Shanske
*Assistant Examiner* — Jesse Prager
(74) *Attorney, Agent, or Firm* — Carlson, Gaskey & Olds, P.C.

(57) ABSTRACT

An assembly for a gas turbine engine includes a minidisk that includes an axial extension extending from a disc. The axial extension includes an inner diameter surface and a recess arranged radially opposite the inner diameter surface. The recess provides a radially outwardly extending flange and a bumper extending radially inward from and proud of the inner diameter surface. A method of working on a gas turbine engine section includes inserting a tool into a cavity beneath a seal assembly, and engaging a flange of a minidisk with the tool to manipulate first and second rotors with respect to one another.

3 Claims, 4 Drawing Sheets

(52) U.S. Cl.
CPC ......... *F05D 2230/70* (2013.01); *Y02T 50/671* (2013.01)

(58) Field of Classification Search
CPC ...... F02C 3/04; Y02T 50/671; F05D 2230/70; F05D 2260/33; F05D 2260/36; Y10T 29/49321
USPC ..................................................... 416/204 A
See application file for complete search history.

(56) References Cited

U.S. PATENT DOCUMENTS

| | | | |
|---|---|---|---|
| 5,288,210 A | | 2/1994 | Albrecht et al. |
| 5,464,227 A | * | 11/1995 | Olson .................. F16J 15/3404 277/400 |
| 5,537,814 A | | 7/1996 | Nastuk et al. |
| 6,179,560 B1 | | 1/2001 | Kouris et al. |
| 6,672,630 B2 | | 1/2004 | Pinzauti et al. |
| 8,747,054 B2 | * | 6/2014 | Witlicki ................ F01D 25/164 415/119 |
| 2003/0017050 A1 | * | 1/2003 | Simeone ................ F01D 5/066 416/96 R |
| 2007/0059164 A1 | | 3/2007 | Brault et al. |
| 2008/0075590 A1 | | 3/2008 | Moniz et al. |
| 2009/0092497 A1 | | 4/2009 | Boeck |
| 2010/0158699 A1 | | 6/2010 | Makuszewski |
| 2012/0076657 A1 | | 3/2012 | Ress, Jr. |
| 2012/0151735 A1 | | 6/2012 | Thomas |
| 2012/0177495 A1 | | 7/2012 | Virkler et al. |
| 2012/0244004 A1 | | 9/2012 | Virkler |
| 2014/0023509 A1 | | 1/2014 | Burt et al. |

OTHER PUBLICATIONS

International Search Report and Written Opinion for PCT/US2014/033154 dated Aug. 14, 2014.
Extended European Search Report for European Application No. 14784968.1 dated Nov. 22, 2016.

* cited by examiner

TURBINE MINIDISK BUMPER FOR GAS TURBINE ENGINE

TECHNICAL FIELD

This disclosure relates to a minidisk for a gas turbine engine turbine section, and more particularly, the disclosure relates to a feature on the minidisk for assembly and disassembly of the turbine section.

BACKGROUND OF THE INVENTION

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Early minidisks were used as windage covers disposed upon rotating gas turbine engine rotors. More modern minidisks are also used to cool the turbine rotor. An axial extension of the minidisk may extend into an area having a seal assembly and bearing.

A typical turbine section includes multiple turbine rotors that are secured to one another using a very large press fit. The minidisk has used an annular recess on the axial extension. A tool cooperates with the annular recess to apply a press load to assemble or disassemble the turbine rotors for service. One prior art arrangement required the entire bearing and seal assembly to be removed to gain access to the annular recess, which made servicing the turbine section considerably more costly.

SUMMARY

In one exemplary embodiment, an assembly for a gas turbine engine includes a minidisk that includes an axial extension extending from a disc. The axial extension includes an inner diameter surface and a recess arranged radially opposite the inner diameter surface. The recess provides a radially outwardly extending flange and a bumper extending radially inward from and proud of the inner diameter surface.

In a further embodiment of any of the above, the recess is axially elongated compared to a radial depth of the recess.

In a further embodiment of any of the above, the recess axially overlaps the bumper.

In a further embodiment of any of the above, the assembly includes a turbine rotor having a hub. The minidisk is mounted on the hub and the hub is operatively supported relative to an engine static structure by a bearing.

In a further embodiment of any of the above, the assembly includes a seal assembly arranged between the minidisk and the bearing to create a bearing compartment.

In a further embodiment of any of the above, the assembly includes a sleeve supported by the hub. The bearing is mounted to the sleeve.

In a further embodiment of any of the above, the hub includes circumferentially spaced radially outwardly extending first tabs. The axial extension includes circumferentially spaced radially inwardly extending second tabs. The first and second tabs are axially aligned with one another and fingers of the sleeve are received in circumferential gaps provided between the first and second tabs to prevent relative circumferential movement between the first and second tabs.

In a further embodiment of any of the above, the sleeve includes an outer diameter surface. A clearance is provided between the bumper and the outer diameter surface of 0.000-0.005 inch (0.000-0.127 mm).

In a further embodiment of any of the above, the seal assembly is secured to the engine static structure. The seal assembly includes a seal support and a carbon seal axially slidable relative to the seal support. The flange extends axially beyond the seal support.

In a further embodiment of any of the above, the flange provides forward and aft tool engagement faces configured to be accessible by a tool with at least a portion of the seal assembly mounted the engine static structure.

In a further embodiment of any of the above, the turbine rotor provides a second turbine rotor. A first turbine rotor is secured to the second turbine rotor at a joint by an interference fit. The flange is configured to be manipulated by a tool to alter the interference fit at the joint.

In another exemplary embodiment, a method of working on a gas turbine engine section includes inserting a tool into a cavity beneath a seal assembly, and engaging a flange of a minidisk with the tool to manipulate first and second rotors with respect to one another.

In a further embodiment of any of the above, the method includes removing a portion of a bearing prior to performing the inserting step.

In a further embodiment of any of the above, the method includes removing a seal land prior to the performing the inserting step, with portions of the seal assembly remaining mounted to an engine static structure during the engaging step.

In a further embodiment of any of the above, the engaging step includes closing the tool radially inward to engage the flange.

In a further embodiment of any of the above, the method includes the step of separating the first and second rotors at a joint having an interference fit.

In a further embodiment of any of the above, the method includes the step of joining the first and second rotors at a joint in an interference fit.

In a further embodiment of any of the above, the engaging step includes deflecting a bumper of the minidisk into engagement with a surface of one of the first and second rotors.

In a further embodiment of any of the above, the first and second rotors are first and second turbine rotors.

In a further embodiment of any of the above, the method includes a sleeve locking the minidisk to one of the first and second rotors.

In a further embodiment of any of the above, the engaging step includes deflecting a bumper of the minidisk into engagement with a surface of an assembly tool.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
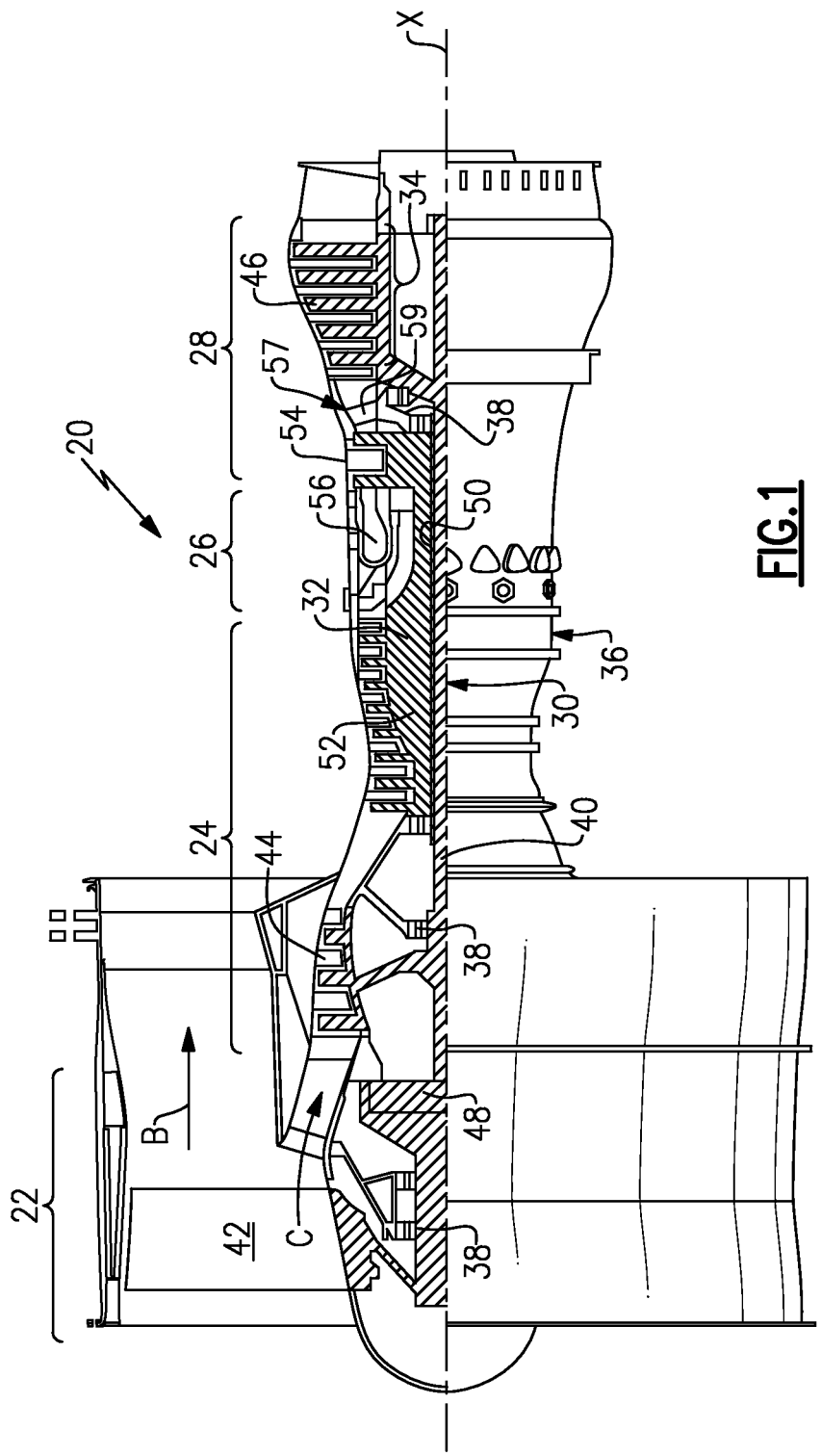
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines and other turbo machinery; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines and other turbo machinery.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft./sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft./second.

Figure 2:
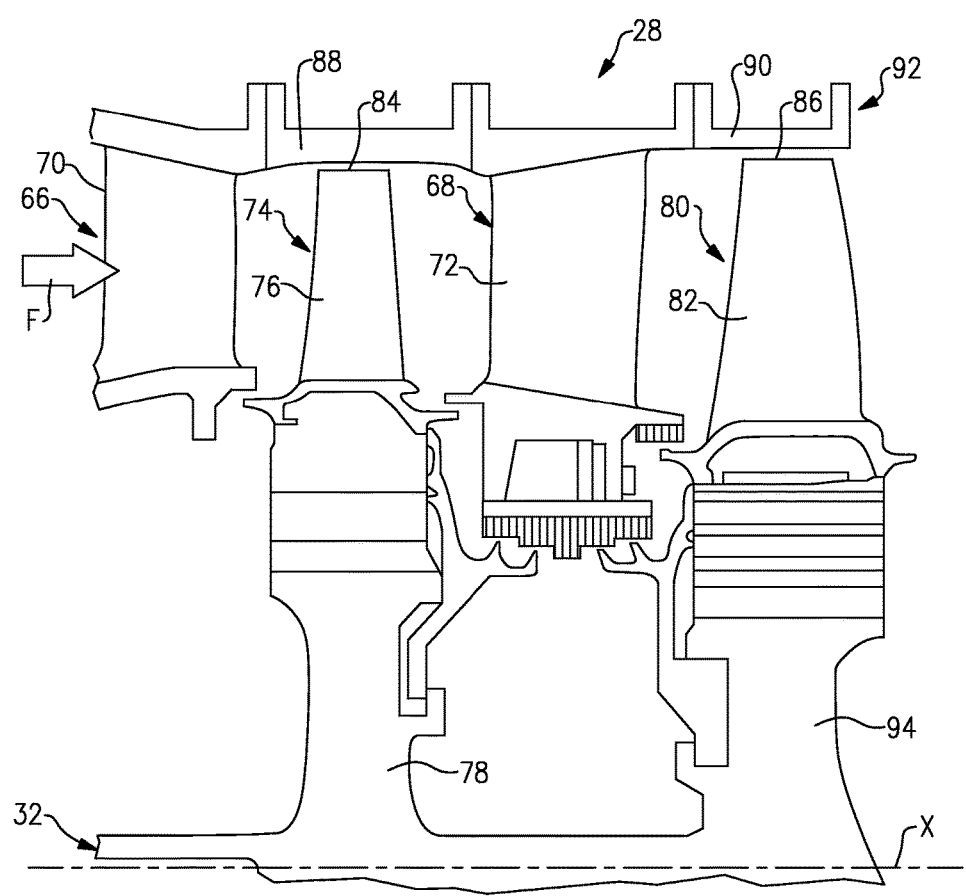
FIG. 2 is a schematic cross-sectional view through a turbine section.

Referring to FIG. 2, a cross-sectional view through the turbine section 28 is illustrated. In the example turbine section 28, first and second arrays 66, 68 of circumferentially spaced fixed vanes 70, 72 are axially spaced apart from one another. A first stage array 74 of circumferentially spaced turbine blades 76, mounted to a first rotor disk 78, is arranged axially between the first and second fixed vane arrays 70, 72. A second stage array 80 of circumferentially spaced turbine blades 82, mounted to a second rotor disk 94, is arranged aft of the second array 68 of fixed vanes 72.

The turbine blades 76, 82 each include a tip 84, 86 adjacent to a blade outer air seals 88, 90 of a case structure 92. The first and second stage arrays 66, 68 of turbine vanes and first and second stage arrays 74, 80 of turbine blades are arranged within a flow path F and are operatively connected to the shaft 32, which is rotatable about an axis X.

One of ordinary skill in the art will recognize that the teachings of disclosed arrangement may be used for either the high pressure turbine section 54 or the low pressure turbine section 46. Moreover, one of ordinary skill will recognize that the teachings herein can be used wherever high press fits are used and may include other parts of the engine like the high pressure compressor section 52, more turbine stages or other types of engines besides the gas turbine engine 20 shown herein.

Figure 3:
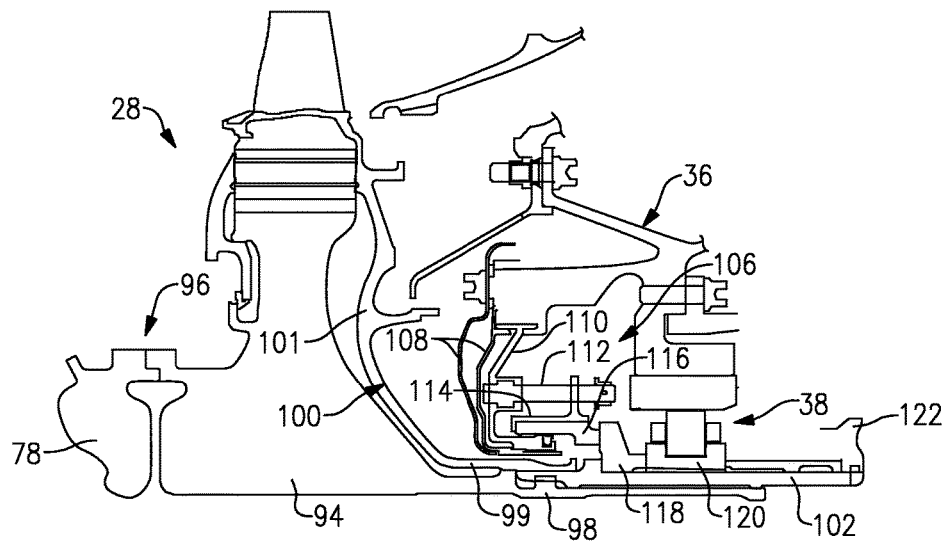
FIG. 3 is a partial cross-sectional view of the turbine section shown in FIG. 2 in more detail.

Referring to FIG. 3, the first and second rotor discs 78, 94 are secure to one another at a joint 96 using a very high press fit load. This press fit load must be overcome during assembly and disassembly procedures of the turbine section 28, for example, during service.

A minidisk 100 is mounted to the aft side of the second turbine rotor 94, which is the last stage in the example turbine section 28. The minidisk 100 provides a plate 101 that creates a cavity in the turbine section 28 that is cooled to lower turbine rotor temperatures. An axial extension 99 is provided by the minidisk 100 and is supported by hub 98 of the second turbine rotor 94. The hub 98 operatively supports the bearing 38 to support the turbine section 28 for rotation relative to the engine static structure 36.

In the example, a sleeve 102 is provided radially between the hub 98 and an inner race 120 of the bearing 38. An air seal assembly 106 is provided between the turbine section 28 and the bearing 38, which is arranged within a bearing compartment that is separated from hot gases by the seal assembly 106. Heat shields 108 are used to further insulate the bearing compartment and seal assembly 106 from hot gases.

The example seal assembly 106 includes a seal support 110 mounted to the engine static structure 36. Multiple circumferentially spaced pins 112 are secured to the seal support 110. A carrier 114 having a carbon seal 116 is slidably supported by the pins 112 for axial movement. A seal land 118 is mounted to the sleeve 102 and arranged adjacent to the inner race 120. The seal land 118 engages the carbon seal 116 during rotation of the seal land 118 with the second turbine rotor 94 and hub 98 to seal the bearing compartment from hot gases. A retainer 122 secures the hub 98, minidisk 100 and sleeve 102 to one another in a stack to maintain assembly loads.

Figure 4:
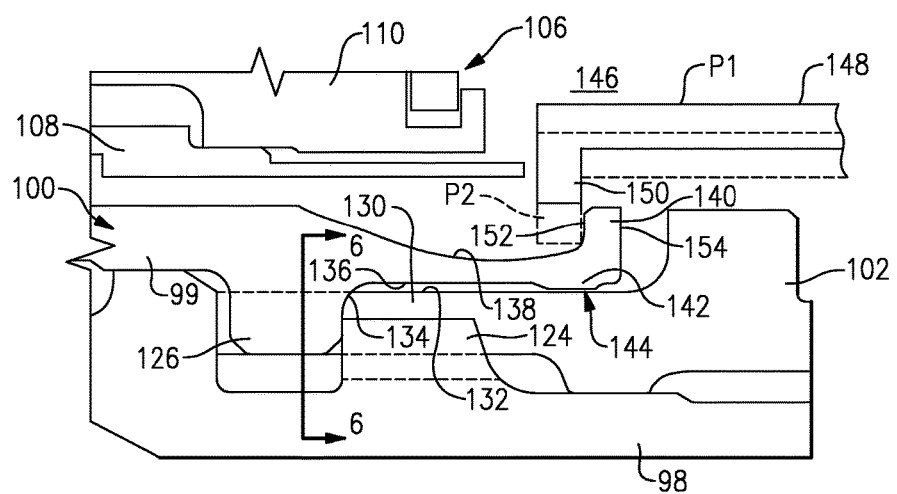
FIG. 4 is an enlarged view of a portion of the turbine section during a disassembly procedure.
Figure 6:
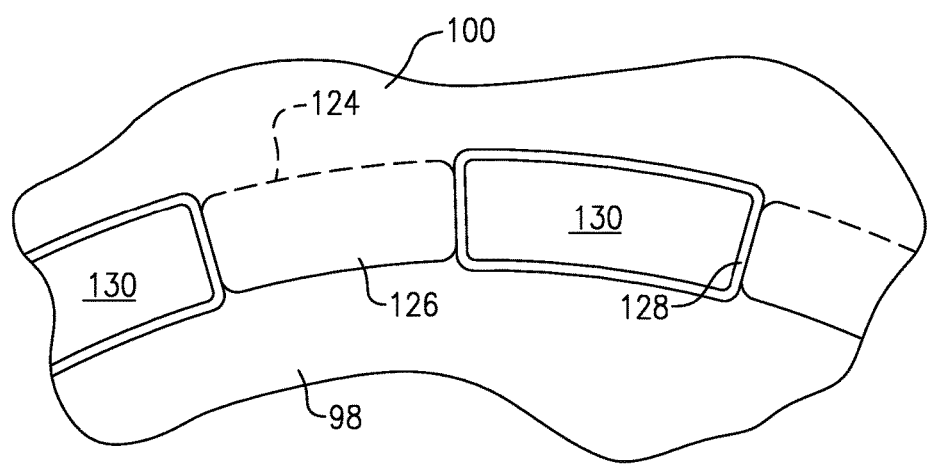
FIG. 6 is a cross-sectional view taken along line 6-6 in of FIG. 4.

Referring to FIGS. 4 and 6, the hub 98 includes circumferentially spaced first tabs 124 that extend radially outward. The axial extension 99 includes circumferentially spaced second tabs 126 that extend radially inward. During assembly, the second tabs 126 are slid through circumferential gaps 128 between the first tabs 124 as the minidisk 100 is mounted onto the hub 98. The minidisk 100 and second turbine rotor 94 are then rotated relative to one another to position the second tabs 126 in alignment with and behind the first tabs 124, as shown in FIGS. 4 and 6. The minidisk 100 is axially retained to the hub 98 in this assembled position. Fingers 130 of the sleeve 102 are inserted into the circumferential gaps 128 to maintain the circumferential position of the first and second tabs 124, 126 and lock the minidisk 100 to the second turbine rotor 94.

An outer diameter surface 132 of the sleeve 102 supports the axial extension 99 during disassembly of the turbine section 28. A radius 134 adjoins the second tabs 126 and an inner diameter surface 136 of the axial extension 99. A bumper 142 extends radially inward from and proud of the inner diameter surface 136, which is cylindrical in shape in the example. In one example, a clearance between the outer diameter surface 132 and the bumper 142 is about 0.005 inch (0.127 mm).

Figure 5:
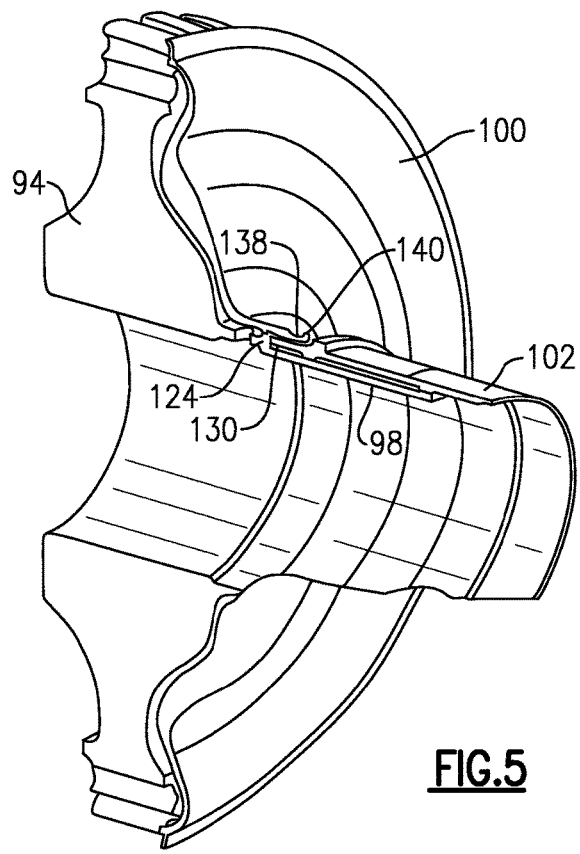
FIG. 5 is a cross-sectional perspective view of a minidisk, turbine hub and sleeve shown in FIGS. 3 and 4.

Referring to FIGS. 4 and 5, recess 138 is provided in the axial extension 99 on a surface radially opposite the inner diameter surface 136 to provide a flange 140. The recess is elongated to reduce the size and weight of the axial extension 99. However, this increases the flexibility of the axial extension during assembly and disassembly procedures. In the example, the recess 138 begins in an area that axially overlaps the second tabs 126. Portions of the flange 140 and bumper 142 axially overlap one another. In the example, the axial length of the recess 138 is at least four times that of the radial depth of the recess 138. The flange 140 is axially outboard of portions of the seal assembly 106, such as the heat shield 108 and seal support 110, such that the flange 140 is readily accessible.

During assembly or disassembly, such as during a service procedure, the inner bearing race 120 and seal land 118 are removed exposing a cavity 146, as shown in FIG. 4. The remaining portions of the bearing 38 and seal assembly 106, including the carrier 114 and carbon seal 116, can remain mounted to the engine static structure 36. A tool 148, similar to a collet arrangement, is inserted into the cavity 146 at position P1. Lips 150 of the tool 148 are deflected radially inward to position P2 to engage the flange 140. During assembly, the lips 150 engage an aft face 154 to apply a pushing load on the minidisk 100 through the flange 140. During disassembly, the lips engage a forward face 152 to apply a pulling load on the flange 140, which can be used to separate the first and second turbine rotors 78, 94 at the joint 96.

During assembly and disassembly procedures, in particular during disassembly, the axial extension 99 is deflected radially inward such that the bumper 142 contacts the outer diameter surface 132. The bumper 142 and its tight clearance with respect to the outer diameter surface 132 prevents the axial extension from plastically deforming or breaking, which enables a smaller, lighter axial extension to be used. In this example, surface 132 is part of sleeve 102 but in another embodiment can be part of tool 148 (shown in the same position as the sleeve in FIG. 4).

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An assembly for a gas turbine engine comprising:
a minidisk including an axial extension extending from a disc, the axial extension including an inner diameter surface and a recess arranged radially opposite the inner diameter surface, the recess providing a radially outwardly extending flange, and a bumper extending radially inward from and proud of the inner diameter surface;

a turbine rotor having a hub, the minidisk mounted on the hub, and the hub operatively supported relative to an engine static structure by a bearing;

a seal assembly arranged between the minidisk and the bearing to create a bearing compartment; and a sleeve supported by the hub, the bearing mounted to the sleeve, wherein the sleeve includes an outer diameter surface, a clearance provided between the bumper and the outer diameter surface of 0.000-0.005 inch (0.000-0.127 mm).

2. An assembly for a gas turbine engine comprising:

a minidisk including an axial extension extending from a disc, the axial extension including an inner diameter surface and a recess arranged radially opposite the inner diameter surface, the recess providing a radially outwardly extending flange, and a bumper extending radially inward from and proud of the inner diameter surface;

a turbine rotor having a hub, the minidisk mounted on the hub, and the hub operatively supported relative to an engine static structure by a bearing; and a seal assembly arranged between the minidisk and the bearing to create a bearing compartment, wherein the seal assembly secured to the engine static structure, the seal assembly includes a seal support and a carbon seal axially slidable relative to the seal support, the flange extending axially beyond the seal support, wherein the flange provides forward and aft tool engagement faces configured to be accessible by a tool with at least a portion of the seal assembly mounted the engine static structure.

3. An assembly for a gas turbine engine comprising:

a minidisk including an axial extension extending from a disc, the axial extension including an inner diameter surface and a recess arranged radially opposite the inner diameter surface, the recess providing a radially outwardly extending flange, and a bumper extending radially inward from and proud of the inner diameter surface; and a turbine rotor having a hub, the minidisk mounted on the hub, and the hub operatively supported relative to an engine static structure by a bearing, wherein the turbine rotor provides a second turbine rotor, a first turbine rotor secured to the second turbine rotor at a joint by an interference fit, the flange configured to be manipulated by a tool to alter the interference fit at the joint.

\* \* \* \* \*